(12) United States Patent
Précenth (10) Patent No.: US 9,278,841 B2
(45) Date of Patent: Mar. 8, 2016

(54) WAREHOUSE TRUCK

(71) Applicant: BT Products AB, Mjölby (SE)

(72) Inventor: Gert Précenth, Mjölby (SE)

(73) Assignee: BT PRODUCTS AB, Mjolby (SE)

( * ) Notice: Subject to any disclaimer, the term of this patent is extended or adjusted under 35 U.S.C. 154(b) by 117 days.

(21) Appl. No.: 14/296,487

(22) Filed: Jun. 5, 2014

(65) Prior Publication Data

US 2014/0361232 A1    Dec. 11, 2014

(30) Foreign Application Priority Data

Jun. 7, 2013  (SE) ...................................... 1350693

(51) Int. Cl.
| | |
|---|---|
| B66F 9/075 | (2006.01) |
| B66F 9/24 | (2006.01) |
| B60L 11/18 | (2006.01) |
| B66F 9/065 | (2006.01) |
| B66F 9/20 | (2006.01) |

(52) U.S. Cl.
CPC ......... B66F 9/07504 (2013.01); B60L 11/1816 (2013.01); B66F 9/065 (2013.01); B66F 9/07572 (2013.01); B66F 9/205 (2013.01); B66F 9/24 (2013.01)

(58) Field of Classification Search
CPC ............ B60L 11/1809; B60L 11/1816; B60L 2220/40; B60L 2220/42; B60L 2230/00; B60L 2230/12; B60L 2230/16; B66F 9/06; B66F 9/075; B66F 9/07504; B66F 9/07572; B66F 9/20; B66F 9/205; B66F 9/24
See application file for complete search history.

(56) References Cited

U.S. PATENT DOCUMENTS

| | | | | |
|---|---|---|---|---|
| 3,915,476 A | * | 10/1975 | Burkle ................... | H01R 13/62 280/422 |
| 4,784,610 A | * | 11/1988 | Stuart ................... | H01R 13/633 174/67 |
| 5,220,268 A | * | 6/1993 | Rose ................... | B60L 11/1818 320/107 |
| 5,545,046 A | * | 8/1996 | Masuda ................... | B60K 1/04 439/142 |
| 5,992,572 A | * | 11/1999 | Gilliland ................... | B66F 9/06 182/148 |
| 7,404,720 B1 | | 7/2008 | Frey et al. | |
| 8,251,742 B2 | * | 8/2012 | Takada ................ | B60L 11/1818 439/271 |
| 2005/0278920 A1 | * | 12/2005 | Bogelein ............. | B60L 11/1822 29/401.1 |

FOREIGN PATENT DOCUMENTS

| | | |
|---|---|---|
| DE | 102012007047 B3 | 4/2013 |
| EP | 0644625 A2 | 3/1995 |
| JP | 2012201461 A | 10/2012 |

OTHER PUBLICATIONS

European Patent Office, Extended European Search Report, Application No. 14171141, Oct. 13, 2014, 5 pages.

* cited by examiner

*Primary Examiner* — Lee D Wilson
*Assistant Examiner* — Tyrone V Hall, Jr.
(74) *Attorney, Agent, or Firm* — Quarles & Brady LLP (57) ABSTRACT

A warehouse truck includes an electric truck contact in direct connection to or on a battery. The electric truck contact is arranged to take part in the switching between three battery modes. The truck contact includes a first group of guides that cooperate with a second group of guides on a truck charging contact and a third group of guides on a truck operation clamp.

10 Claims, 11 Drawing Sheets

WAREHOUSE TRUCK

CROSS-REFERENCE TO RELATED APPLICATIONS

The present application claims the benefit of Swedish Patent Application No. 1350693-6 filed Jun. 7, 2013, which is fully incorporated herein by reference.

STATEMENT REGARDING FEDERALLY SPONSORED RESEARCH OR DEVELOPMENT

Not applicable.

FIELD OF THE INVENTION

The invention relates to warehouse trucks, in particular warehouse trucks provided with a truck contact, electric truck charging contacts, an electric truck operation clamp and a warehouse truck arrangement.

BACKGROUND OF THE INVENTION

At electric powered lifting trucks with forks of the type warehouse trucks, there is utilized large and heavy batteries for allowing long working cycle times between recharging of the battery. The utilization of the batteries can be divided into two different operation cases. The battery can be charged on board the truck, or the battery can removed from the truck and charged. In the latter case there is provided several batteries that can replace the battery on charge.

In the case with batteries to be charged on board of the truck, the battery is connected in situ in the truck to a charging station. The truck is inoperable during the charging period, but at the same time battery switches are avoided and it is thereby possible to save the cost for extra batteries, as well as the management of these. When connecting, the contact at the battery is detached from the circuit that leads to the consuming items in the truck. Thereafter the battery is connected to a charge cable that leads to a battery charger, as an alternative a charger can be present on the truck and in that case the cable is connected to a power supply.

When the battery is to be charged, the connector of the battery also named charging glove, is disconnected from the corresponding contact in the truck and instead connected to a charging socket on the charging station. The charging glove in trucks is of the slide on type. I.e. a male contact and a female contact are united and a lock applies to keep the contact in position, during the charging process, and this also when connecting consumers and the battery. The force that is needed to bring the two elements together is required in order to achieve contact, in particular when large currents are dealt with in the order of 100 to 500 Amperes. As disconnection and connection of the charging glove is done daily or sometimes several times a day, wear of the charging glove is inevitable. Thus it has not traditionally been of interest to introduce something else than the simplest shape of a charging glove as this has to be exchanged on a regular basis.

The batteries of electrically powered trucks have an energy density that is measured in hundreds of Ampere hours. Batteries with less than 100 Ampere hours are non-existent. Thus equipment for batteries with lower energy content is not considered a possibility for batteries for electrically powered trucks. Batteries can be charged in two ways. On one hand the battery can be charged on board of the truck or the discharged battery can be replaced with a fully charged battery and the discharged battery is charged separated from the truck. The latter is common when the truck is operated in shifts, as the recharging of the battery takes approximately a shift.

When charging the battery on board, the battery is connected to the connector with a cable. The connector has two contacts one for positive and one for negative, exactly as the output current from the battery. The cable usually has a length so that it at disconnection from the consumer can be connected to the charging station. The length of the cable is thus provided such that the connection of the battery can be performed outside the line of periphery of the truck. With periphery line is intended a horizontal circumference that follows the contour of the truck at different levels. In the forward direction the periphery line is limited by the lift forks, the sides by the truck body itself or as an alternative by a broader fork sledge. When the cable is connected to the consumers there is in other words an excess in length of the cable. This must be dealt with, primarily as the outgoing cable from the battery is not secured with a fuse. To roll up the cable is difficult due to the thick dimension. If the operator handles the cable wrongly and allows it to hang outside the truck body a security risk occurs. A stressed operator can thus instead of stowing the cable under for example a hatch, neglect to do this. It is thus the length of the cable that allows for this loop to be hanging out.

The connection of the cable is in general positioned close to the battery, which is in the vicinity of the gravity centre of the truck. In the vicinity of the gravity centre is generally also positioned for example the hoisting device such as the lifting mast. It is easy to understand that if the cable thus is clamped for example in the mast, the battery is short circuited, which not only destroys the battery but also can lead to fire or worse injuries to the personnel that is operating the truck. To solve this there are different solutions. One of these involves that the two poled cable and the two pole connection contact are always positioned under a hatch that always is to be closed during operation. Another simpler solution is that one has a fixed connection contact on the truck without a loose cable. To then achieve connection and disconnection of the consumers a three pole contact is introduced on the truck. To this contact is in operation of the truck two of the poles connected with each other with a so called operation clamp, to thereby connect the battery to the consumers.

At charging, the operation clamp is removed and instead the charging cable is connected to two of the three poles, one of which is common with the connection of the operation clamp. The operation clamp and the charging cable are connected to the battery at breast height of an operator, when this system is used in on large trucks, such as reach trucks and very narrow aisle trucks. A simple and well operating operation clamp has a handle with two pins that can connect the circuit to the consumers but leave the third hole free. From the asymmetry for an operation clamp and a charging contact it can be understood that a swivel effect occurs when connecting two pins towards three holes. The swivel effect augments the push force. When at breast height when connecting on a larger warehouse truck, the push force or pull force does not exceed the force a general operator can achieve, thus the operation clamp can be made in the simplest possible way.

The warehouse trucks is more and more used as effectively as possible, i.e. the operating time at each hour of performed work increases more and more, as more goods is to be handled. To manage this rate it is required more and more energy to the consumers per time unit in warehouse of trucks today. Not at the least for performing higher lifts and higher transport velocities than before. With higher transport velocity is also added the ability to increase the warehouse area and thus longer transport distances are added each shift. All these measures provides for an increased need to charge more often has been added, the warehouse truck turns over more energy and needs power supply more often and in larger amount. In connection with this it has been found that the push force and the disconnection force for the charging contact has an increased importance to the ergonomic when using warehouse trucks. I.e. with an increased frequency of charging a need arises for simplifying disconnection of the operation clamp and connection of the charging contact by improved accessibility. For example it is a desire to avoid the said hatch without inducing a problem with cable breaks due to loosely hanging cables.

At an increased charging frequency a problem also arises when a stressed operator does not disconnect the charging process before the charging contact is disconnected. To solve this, a charger that can automatically disconnect the current has been introduced. However the disconnection does not occur fast enough if the operator snatches away the charging contact. The on-going charging process will then have no time to be aborted by the charger. This can give rise to formation of sparks and disturbance of the function of the battery.

SUMMARY OF THE INVENTION

To solve at least some of the mentioned problems it is suggested a ware house truck comprising, a lifting device, an electricity consuming drive motor, an electricity consuming hydraulic pump motor, wherein the truck further comprises a battery arranged to supply at least one of the electricity consuming motors, wherein the ware house truck is provided with an electric truck contact in direct connection to or on the battery, wherein the electric truck contact is arranged to take part in the switching between three battery modes: completely disconnected battery, battery connected for charging, and operating mode for the truck. The truck contact includes guides that cooperate with guides on a truck charging contact and guides on a truck operation clamp. The guide means provide for that the truck contact and the truck charging contact, and the truck operation clamp, only can be connected in a predetermined position. The truck contact includes three contact elements, preferably in the form of three contact holes, and the truck contact includes a notch, wherein said notch intersects a spiral shaped notch or groove with a predetermined pitch. The notch is associated with a protrusion on the truck charging contact or with a protrusion on the truck operation clamp, which results in that the respective contact hole engages with connection pin or pins, on the truck charging contact or connection pin or pins, on the operation clamp to a fully connected position when this protrusion completes its movement in said spiral shaped notch and by doing this drive in respective connection pin for connection of respective truck charging contact and operation clamp. The spiral shaped notch has an extension and a pitch arranged such that connection and disconnection of respective connection pin to and from fully connected position, is delayed compared with a linear connection and disconnection respectively with a lack of guiding by the protrusions in the notch.

The effect that is achieved by the present invention is that the battery in the warehouse truck cannot be damaged at a fast connection and disconnection of the charging contact and the operation clamp. A further effect is achieved by that the push force is lowered. This in turn makes the positioning of the connection of the charging contact can be made with much more flexibility, the position need not be chosen due to the strength of the operator, a hatch is avoided. This at the same time as the time for connection and disconnection is extended in the essential way that is demanded such that no damage shall occur on former and most, more modern batteries such as Li-Ion batteries. One further effect of this is that the working conditions for the operator is simplified, which in turn provides for that the operator does not omit, or alternatively completely fails to charge the truck due to high forces that are involved. It will also be easier for the operator to terminate charging and connect the operation clamp.

Further the warehouse truck can be provided with a charging contact wherein the spiral shaped notch has a pitch and extension that are arranged such that the connection and disconnection time for the truck charging contact or the operation clamp to the truck contact reaches at least 40 milliseconds, preferably at least 50 milliseconds.

Further the truck contact of the warehouse truck can be arranged such that the spiral shaped notch runs to a stop that is positioned in the range 75-100 degrees of extension viewed axially for the truck contact, preferably 85-95 degrees of extension. These ranges provides for a convenient swivelling for an operator, and these provides also for that the pitch of the notch is such that connection is achieved with sufficient time consumption and sufficient minimization of the swivel force for the operator.

Further the truck contact of the warehouse truck can be arranged such that the spiral shaped notch has a pitch that provides for that a charging contact or an operation clamp moves a distance in the range of 5 mm to 30 mm, preferably 10 mm to 25 mm, more preferred essentially 20 mm from disconnected to fully connected position and the opposite, at the truck contact. This provides for that a complete connection can be achieved for the high current intensities that should be able to be managed.

Further the truck contact can be arranged to be able to handle currents intensities up to 500 Amperes, preferably up to 400 Amperes. At these current intensities a sufficiently fast charging of a battery is guaranteed.

Warehouse truck can have a truck contact according to the above, wherein the notch is provided with a stop for indicating fully connected position, preferably the stop is provided with a step. The effect of this is that an indication of fully connected position is achieved. With step there is also received a tactile feedback to the operator, as well as a locking in the position of full connection.

The invention further comprises a truck charging contact for connection to the warehouse truck according to the above, as well as an operation clamp for connection to the warehouse truck according to the above. The invention further comprises a warehouse arrangement comprising such a warehouse truck, truck charging contact and operation clamp. The invention also relates to a method of modifying a warehouse truck such that it gets a design according to the above.

DETAILED DESCRIPTION OF THE EXAMPLE EMBODIMENTS

Figure 1:
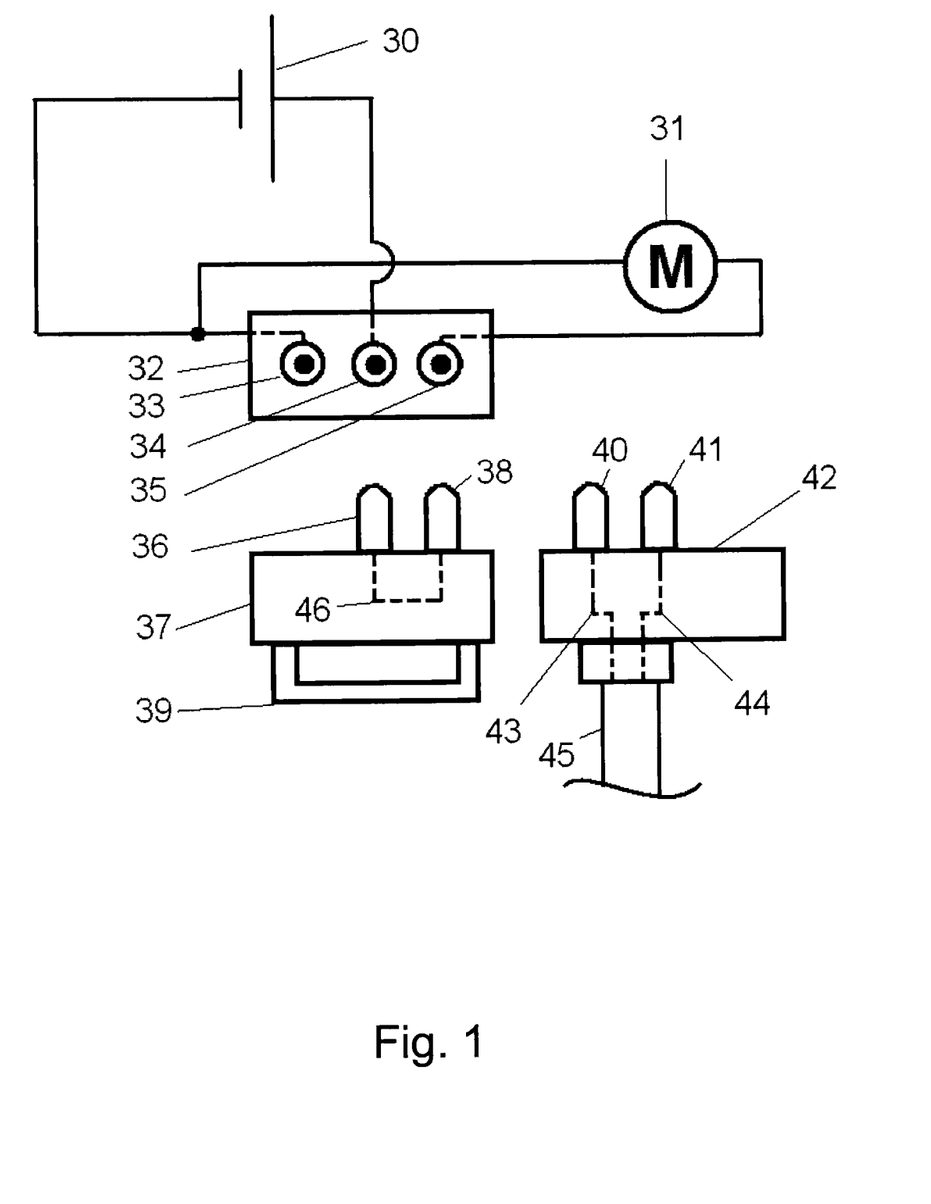
FIG. 1 discloses a circuit with a contact arrangement according to the prior art.

According to FIG. 1 a circuit diagram for the prior art. This circuit diagram discloses an installation where charging is made possible by a warehouse truck with the battery installed into the truck. According the know art of FIG. 1 there is a power source 30 that supplies a consumer 31. The consumer is according to claim 1 an electric motor M. The contact 32 is positioned in the warehouse truck. The contact 32 is positioned in the warehouse truck. It is positioned with the three contact holes 33, 34, 35 pointing out from the warehouse truck. At operation of the warehouse truck an operation clamp is connected to the right contact holes 34, 35. The operation clamp 37 clamps these two holes 34, 35 through the line 46 such that current can flow to the electric motor 31. When charging the battery 30 the operation clamp 37 is removed and instead the charging contact 42 is put into the left holes 33, 34 of the contact 32. In this position the right contact hole 35 is empty, and no current can flow to the consumer 31. The charging current arrives through an external cable 45. As can be seen in FIG. 1 the operation clamp 37 is very simply designed, that provides for a cost efficient solution and at the same times a simple easy-to-understand solution for the operator.

The power source 30 is usually a battery. Today it is common with so called lead batteries.

The consumer above is given as an electric motor. It should be understood that the consumer 31 can be any part of the truck that needs power supply with electric current. It can be both lighting, horn, electronics, truck computer or other devices such as sensors, electrically controlled valves etc. However consumers with a low need for current are not solely connected through the operation clamp 37, but these are connected to circuits that are not disclosed. The operation clamp 37 must be intended for handling all currents in the truck also those which are demanded by an electricity consuming drive motor or a hydraulic pump motor. An operation clamp arranged to handle very small currents are not suitable and the person skilled in the art would instead use a normal electric switch.

Figure 2:
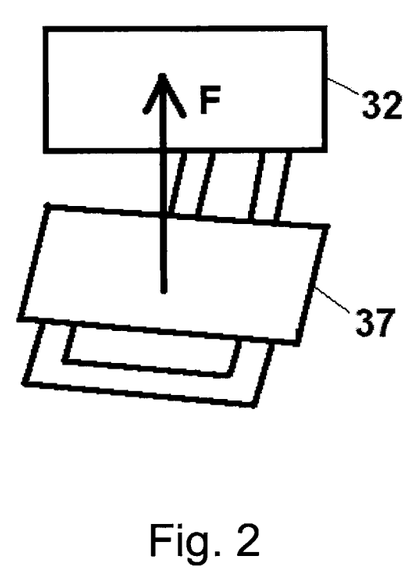
FIG. 2 discloses an operation clamp according to the prior art.

When the charging contact 42 or the operation clamp 37 is to be connected to the contact 32 swivel effects easily occurs as illustrated in FIG. 2. The push force F increases and the operator has to press hard to introduce the connection pins 36, 38, and 40, 41. FIG. 2 discloses this swivel effect and how the operation clamp 37 can end up inclined in relation to the warehouse truck contact 32. The same is relevant for the connection of the charging contact 42 but the swivel effect occurs then to the left of FIG. 2. With increased push force F the swivel force is overcome and the operation clamp 37 connects in intended manner to achieve the clamping that is needed when operating the warehouse truck, in accordance with the circuit of FIG. 1. The charging contact 42 is connected in the same way, but is a bit more unwieldy as thick current cables are attached to the contact. The current cables' thickness can vary but is generally in the range of 10 mm to 20 mm in diameter, for trucks. FIG. 2 discloses connection, but it shall of course be understood that also at disconnection of the operation clamp 37 and the charging contact 42 a swivel effect occurs that increases the disconnection force.

The charging contact 42 shall be understood as being either a contact that is connected to an external charging device that controls charging currents etc. The external charging device is in turn connected to a current supply. But the charging contact 42 shall also be understood as being a contact that is connected to an external current supply. In the latter case the truck is provided with an own on-board charger. This is the same for all discussed trucks within the scope of this patent application. It is however important to understand that the truck according to standards cannot be driven with the charging contact 42 connected.

Figure 3:
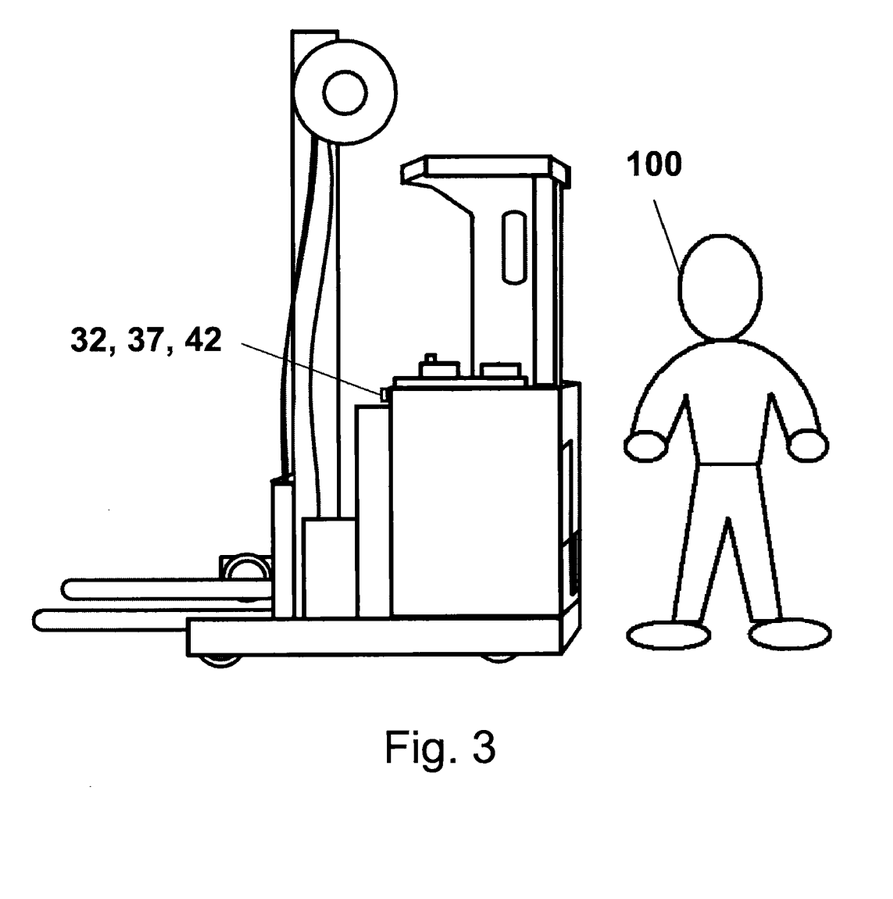
FIG. 3 discloses a reach truck according to the prior art.

The push force F is not an obstacle if the contact 32 is positioned in breast height for an operator, se FIG. 3, where such an installation is disclosed for a reach truck with the operator as an example is positioned next to this.

Figure 4:
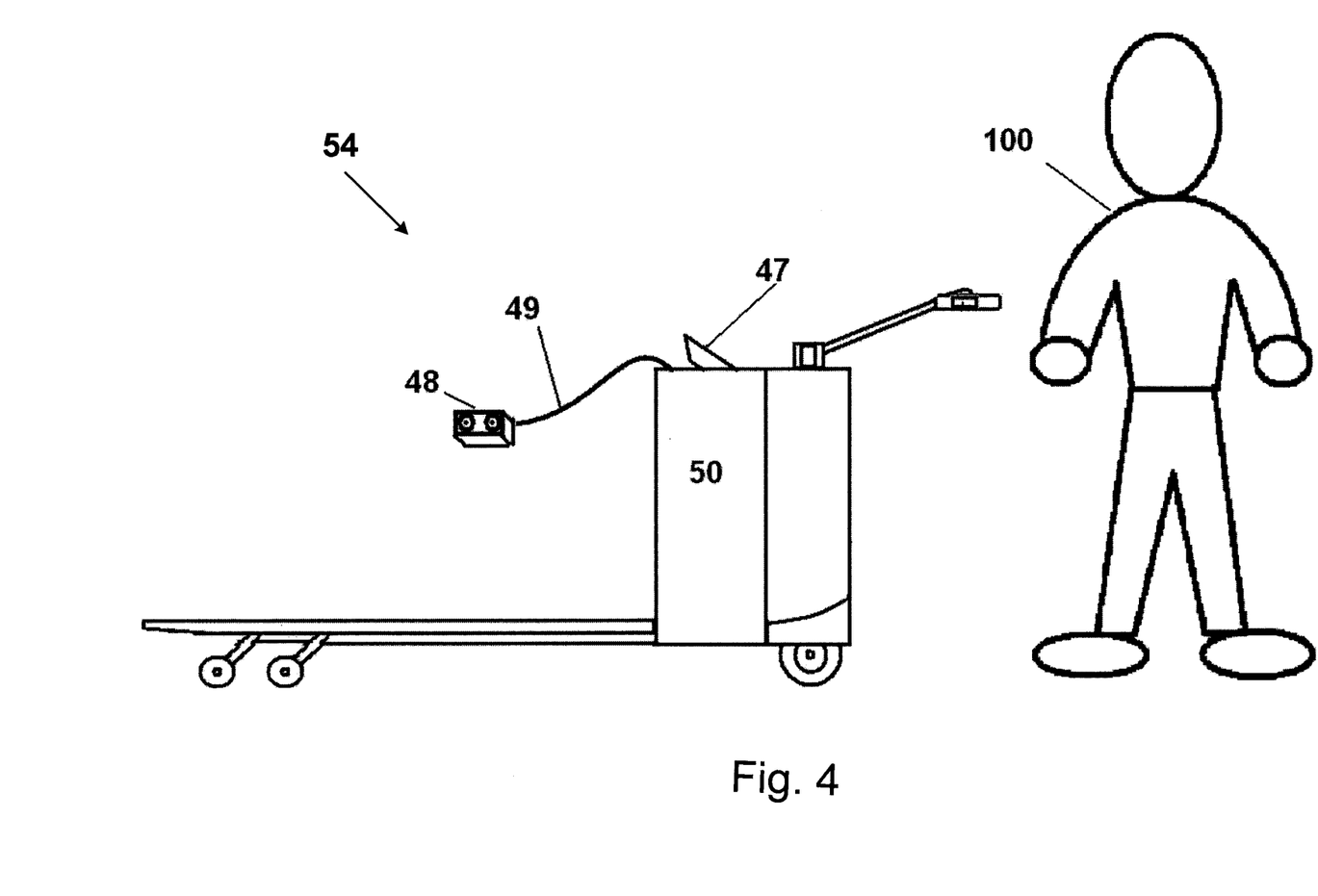
FIG. 4 discloses a tiller arm truck according to the prior art.
Figure 5:
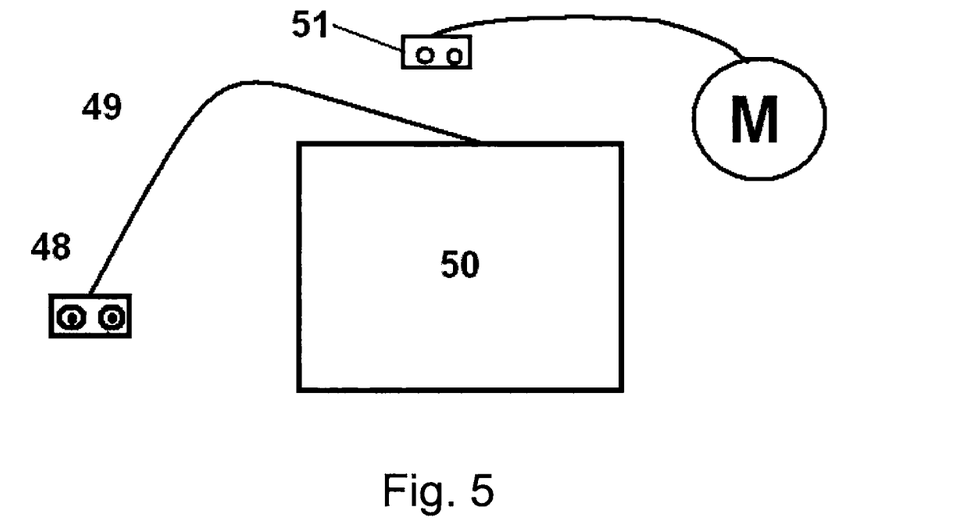
FIG. 5 discloses a contact arrangement according to the prior art.
Figure 6:
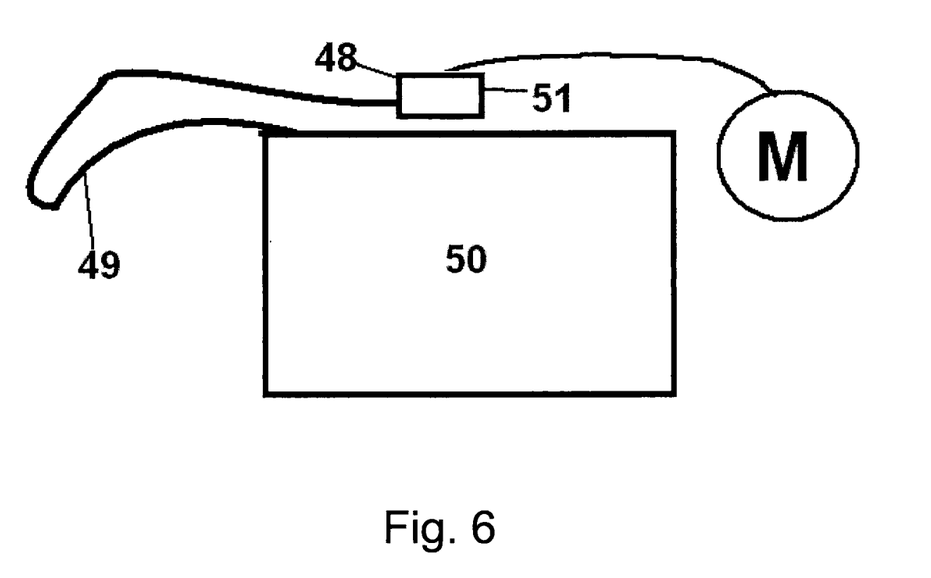
FIG. 6 discloses a contact arrangement according to FIG. 5.

FIG. 4 discloses a smaller warehouse truck 54 in the form of a tiller arm truck, this truck 54 likewise have an indicated contact for charging 48. For a convenient usage a two pin contact 48 disconnects from the battery 50 and then connects to a charger (not shown). Alternatively the truck has a charger that is built in and then the built in charger in the truck is connected to an external current supply when charging. To manage the above discussed cable problem in operation, the cable 49 between contact and the battery 50 is allowed to reside under a hatch 47 on the upper side of the truck chassis. At increased charging frequency there is a desire for easier access of the charging contact. But this gives rise to a problem with the cable 49 which at connection to the battery hangs down or outside the truck body, see FIG. 5 or 6. Thereby the above system does not function for any optional position on the truck.

If it is desired to use the system described in connection with FIGS. 1 and 2, with operation clamp 37 problems arises. As the smaller warehouse truck 54 is lower an operation clamp 37 and a charging contact 42 cannot be positioned on a height that corresponds to the height of a larger warehouse truck according to FIG. 3. It is also desired to lower the position of the contact on trucks that are provided with so called Li-Ion batteries. The reason for this is to be able to connect charging contact and operation clamp directly on the battery or in very close cooperation to the battery. Also with older lead batteries, it is desired to be able to lower the connection height, for being able for the same reasons affect the connection. However if this is done there occurs swivel effects, but also due to the dimension of the contact pins 36, 38 and 40 and 41. As the currents are higher at fast charging there is demanded contact pins with larger dimensions which in turn increase the push force further.

Another very important aspect is that at increased charging currents the consequences of disconnection of a charging contact 42 is larger if as the case may be the current has not been cut before the charging contact 42 is disconnected. With an increased disconnection force the operator will snatch away the charging contact 42 which leads to a too fast disconnection. If furthermore the contact is positioned in a position below the waistline of the operator this increases the risk that the operator snatches the charging contact which leads to a too fast disconnection. With too fast disconnection are meant disconnection times below 40 milliseconds, preferably 50 milliseconds. One example on a fast disconnection time is 11 milliseconds.

Figure 7:
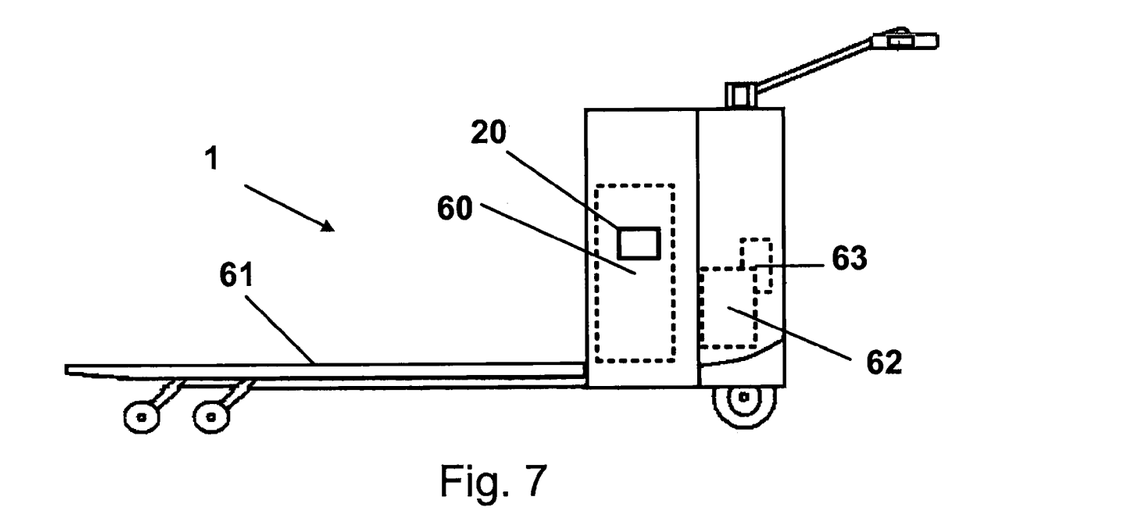
FIG. 7 discloses an example of a warehouse truck in the form of a tiller arm truck according to the invention.
Figure 8:
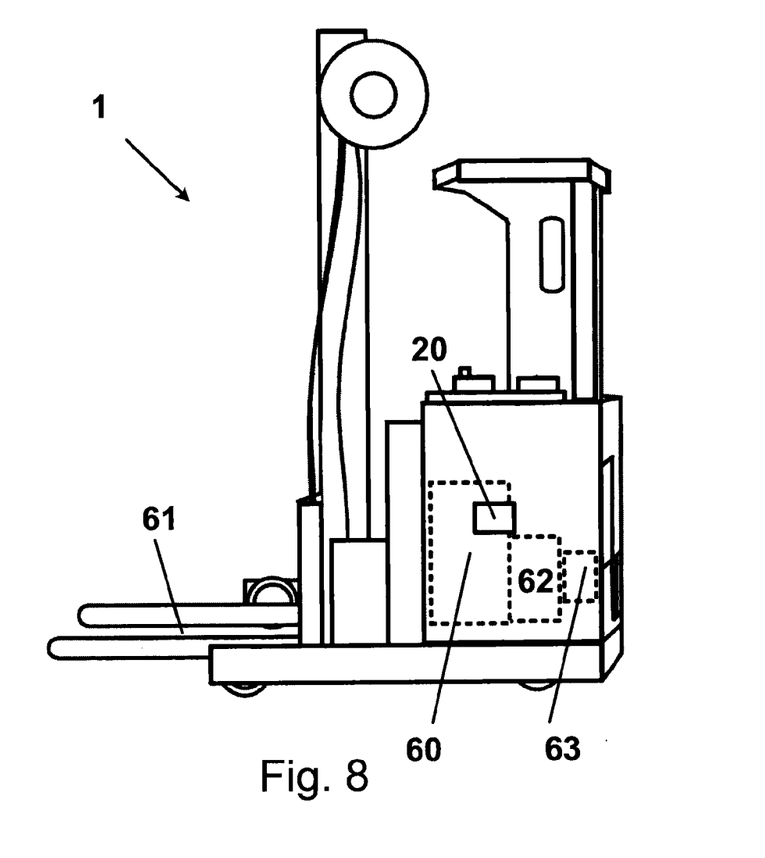
FIG. 8 discloses an example of a warehouse truck in the form of a reach truck according to the invention.

According to the above a new warehouse truck 1 is disclosed. The warehouse truck is exemplified through FIG. 7 as a low lifting tiller arm truck and in FIG. 8 through a high lifting reach truck. The warehouse truck 1 comprises a lifting device 61 in the form of forks. The warehouse truck 61 further comprises a battery 60 for powering of an electricity consuming drive motor 62. Furthermore the warehouse truck comprises an electricity consuming hydraulic pump motor 63, which is also powered by a battery, in most cases this battery is constituted of the battery 60. The warehouse truck 1 comprises further an electric truck contact 30. The electric truck contact 20 is positioned close to the battery 60. The truck contact 20 can also be directly connected to on the body of the battery itself.

The battery 60 can advantageously be a fast charging battery, for example a Li-Ion battery. Not the least there is an advantage with these batteries as they can be charged quickly and with high currents in the order of 500 Amperes. They also have a discharging curve that is advantageous as the battery delivers an essentially constant voltage during the discharging procedure.

With warehouse truck is to be understood a truck that is intended to be operated primarily in an environment of a warehouse, such as within a warehouse building, loading and unloading of lorries, handling of goods within stores etc. For this purpose it is provided with a lifting device in the form of forks. It also has a drive motor and a lift motor for hydraulics. More precisely it concerns an electrically powered warehouse truck. With warehouse truck are not to be understood vehicles in general. The warehouse truck is intended to be driven on a surface that supports the truck, it is not intended to be operated on country surfaces where the wheels of the truck would leave tracks in the surface, such as gravel, forestry land, or the like grounds.

Figure 9:
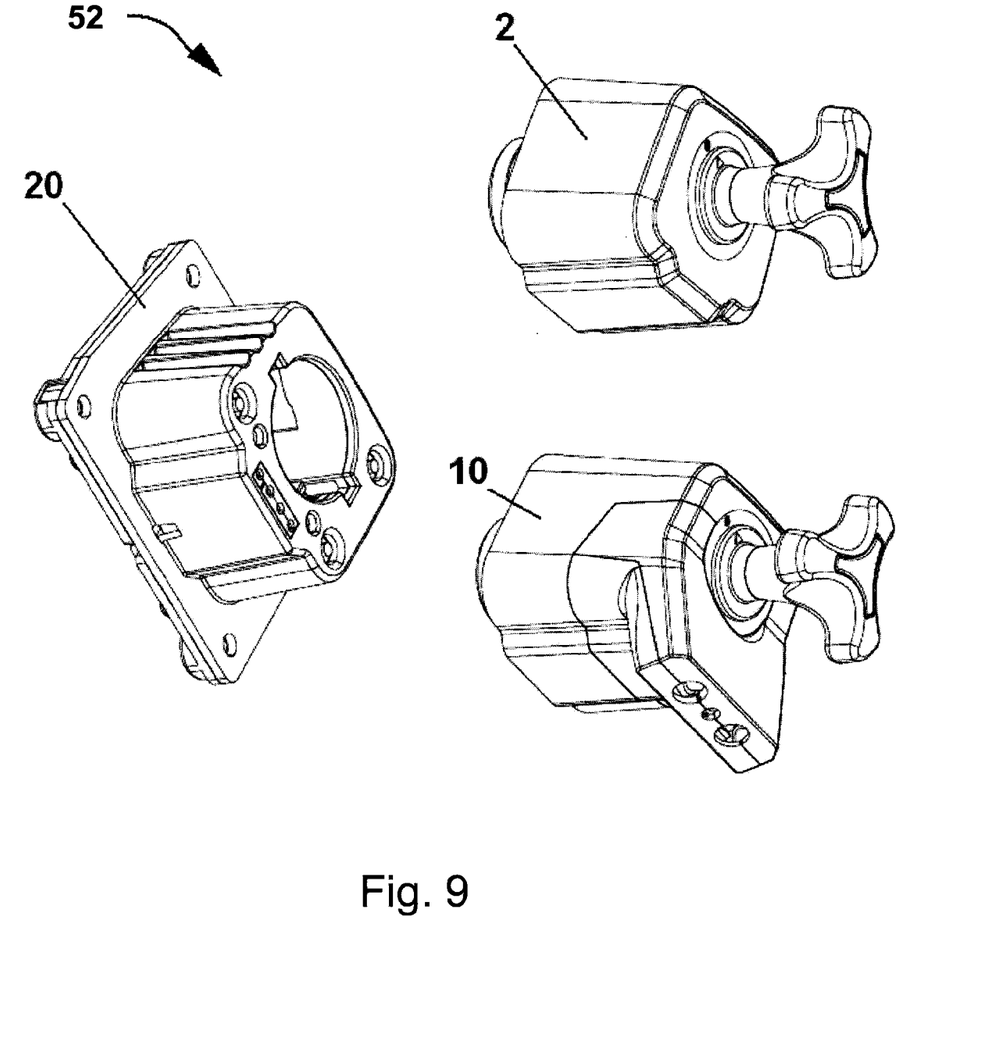
FIG. 9 discloses a contact arrangement for a warehouse truck according to the invention.
Figure 16:
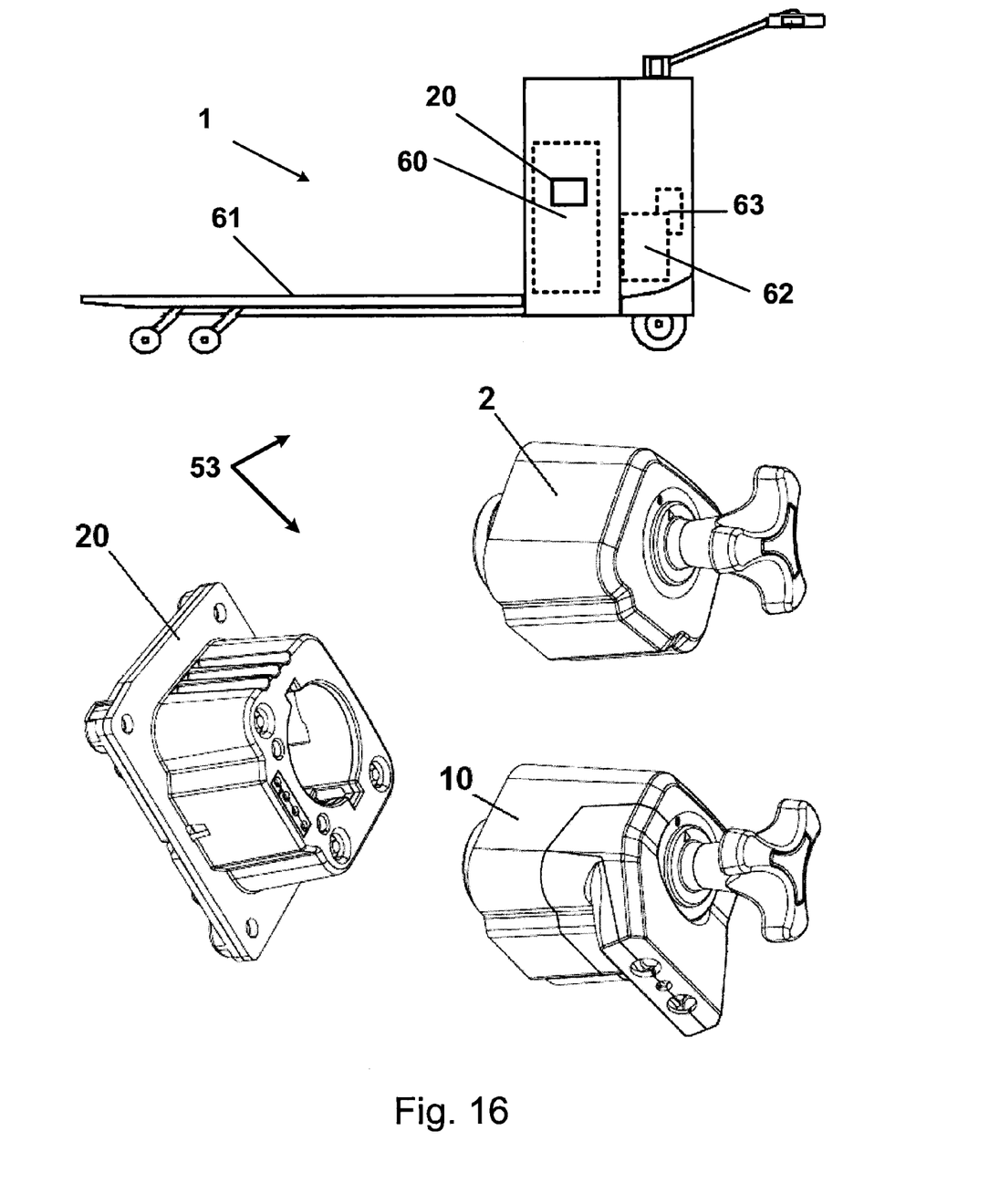
FIG. 16 discloses a warehouse truck arrangement according to the invention.

FIG. 9 discloses a contact arrangement 52 which is comprised in a warehouse truck arrangement 53 disclosed in FIG. 16. The warehouse truck arrangement 53 comprises a warehouse truck 1 with a truck contact 20 and an operation clamp 2 and a charging contact 10 and truck contact 20, FIG. 16. The new warehouse truck 1 provides for easier connection and disconnection of the operation clamp 2 and the charging contact 10 to and from the truck contact 20. The disconnection time for primarily the charging contact 10 is increased at the same time. This points to a desire of a person skilled in the art to increase the efficiency for each working moment for a warehouse truck. As warehouse trucks are used very intensely, the person skilled in the art always wants to minimize time consumed for each stage of management of the warehouse truck.

Figure 10:
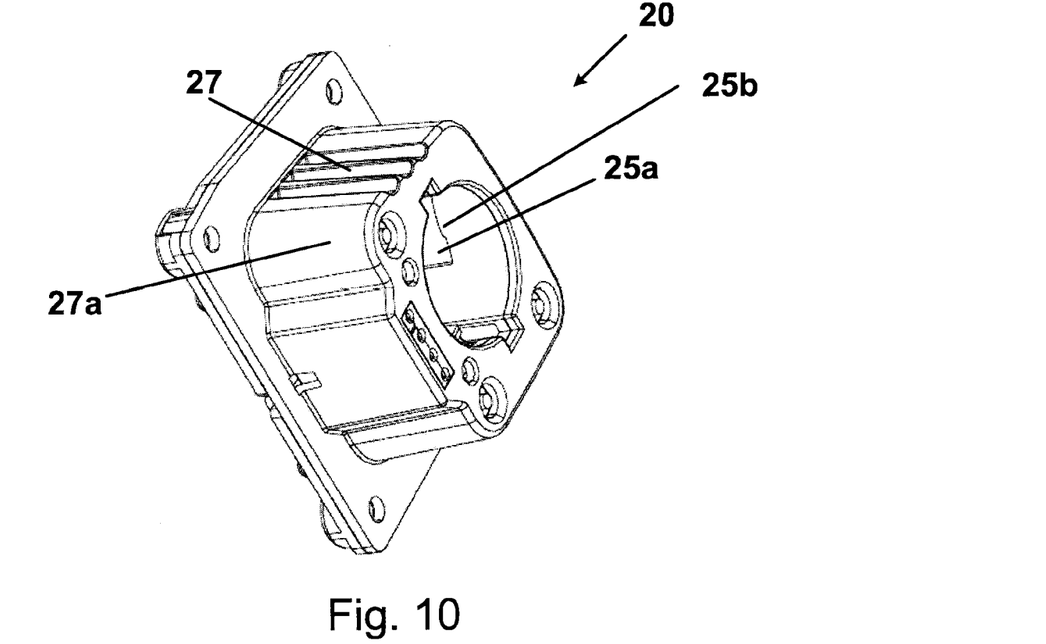
FIG. 10 discloses a truck contact according to the invention.
Figure 11:
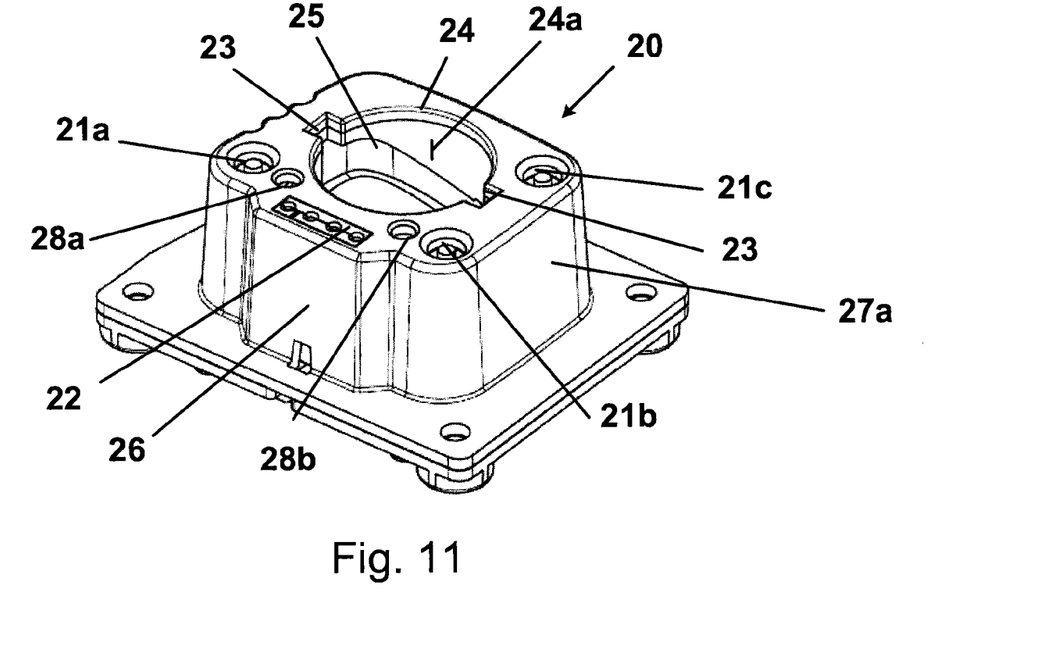
FIG. 11 discloses a truck contact according to FIG. 10.

Starting from FIG. 10 discloses a part of the warehouse truck 1 in form of the truck contact 20. It is a female contact that is intended to be able to be positioned in any optional position of the truck. With a truck contact 20 is intended specifically the described contact. It is intended to be mounted fixed to a warehouse truck 1 according to the invention. Either the truck contact 20 is mounted on the chassis itself with a cable running to the battery 60, or it is mounted directly to the body of the battery 60. It shall not either be considered as a contact in general, but it is intended to be a contact such that the warehouse truck 1 can be provide with current for charging a battery, which battery primarily shall be used for operation of the warehouse truck 1 for propulsion and handling of goods. The truck contact 20 has three contact holes 21a, 21b, 21c. The contact holes 21a-c have the same function as the previous described contact holes 33, 34, 35 of FIG. 1. The truck contact 20 can thereafter optionally be provided with contact holes 22 for communication between an external charger if used and the warehouse truck 1. In this case it is disclosed contact holes 22 for CAN communication. Positioned centrally on the truck contact 20 there is a main opening 24. The main opening 24 is essentially circular but has two notches 23 on the periphery. The notches 23 are opposite each other. The shape of the notches 23 is not critical, but shall allow passage of a protrusion that is described below in connection with a charging contact 10 and operation clamp 2 according to the invention. The notches 23 are disclosed as opposite to each other in FIG. 10 and FIG. 11. It is not necessary that the notches 23 are exactly opposite to each other. Other designs are thinkable. It is also thinkable with one single notch 23. However this gives an inferior function of the warehouse truck 1, as for example swivel effects can occur transversally to the main opening's central axis.

Beginning from the notches 23 runs a spiral shaped notch 25 on the wall 24a of a cylindrically shaped section that takes its beginning in the main opening 24. The notch 25 has an extension that runs approximately 90 degrees along the wall and terminates with a larger stop notch 25a. The stop notch is preferably designed such that there is a step 25b from the running notch 25. The step 25b provides that an operator gets a tactile feedback on that a connected charging contact 10 or an operation clamp 2, has reached the stop 25a. The step 25b also has the function that the operation clamp or the charging contact is kept in fully connected position. The given angle value shall be considered in axial direction for the truck contact 20, which is in the direction in which the said cylindrically shaped section is extending. Even if the extension is given to be 90 degrees it shall be understood that the notch 25 can have an extension that is different. The extension of the notch 25 can be 45 degrees-100 degrees, preferably 85-95 degrees. The pitch of the spiral shape of the notch 25 is such that connection pins on the operation clamp 2 and charging contact respectively are fully connected with contact elements in the form of contact holes 21a, 21b and/or 21c, when protrusion or protrusions on the charging contact 10 and the operation clamp 2 is/are positioned in the larger stop notch 25a. The pitch of the notch 25 is preferably at least 5 mm to 30 mm, preferably 10 mm to 25 mm, preferably approximately 20 mm per swivelling of 75-100 degrees, preferably 85-95 degrees, more preferred approximately 90 degrees. The contact elements are constituted preferably of contact holes 21a, 21b or 21c, preferably there is centrally positioned in the contact holes a contact pin. The contact pin is intended to be connected to a central notch on a connection pin of a truck charging contact 10 or a truck operation clamp 2.

The truck contact 20 comprises further a first group of guide means 26, 27. In the group of guide means a protrusion 26 is comprised. The protrusion 26 increases the truck contact's volume and arranges a space where for example connections for CAN-communication can be positioned. The protrusion 26 gives guidance for the operation clamp 2 and the charging contact 10, to prevent these from being positioned wrongly. In the group of guide means is also comprised guides in the form of guide ribs 27 on one side of the truck contact 20. It shall also be noted that the truck contact preferably are designed such that it discloses a rectangular shape in the protruding section 27a in which the opening 24 begins. The rectangular shape of the section 27a itself, provides for that the contact in itself constitutes a guide to the corresponding cover 10a, 9c on the truck charging contact 10 and the operation clamp 2. If the contact is provided with CAN-communication connection, the first group of guide means is suitably provided with holes 28a, 28b that can connect to pins 19a, 19b, on the truck charging contact 10. The operation clamp 2 normally does not have CAN-communication. If this should be desired the operation clamp 2 can be provided with guide pins in the same way as the truck charging contact 10.

Figure 12:
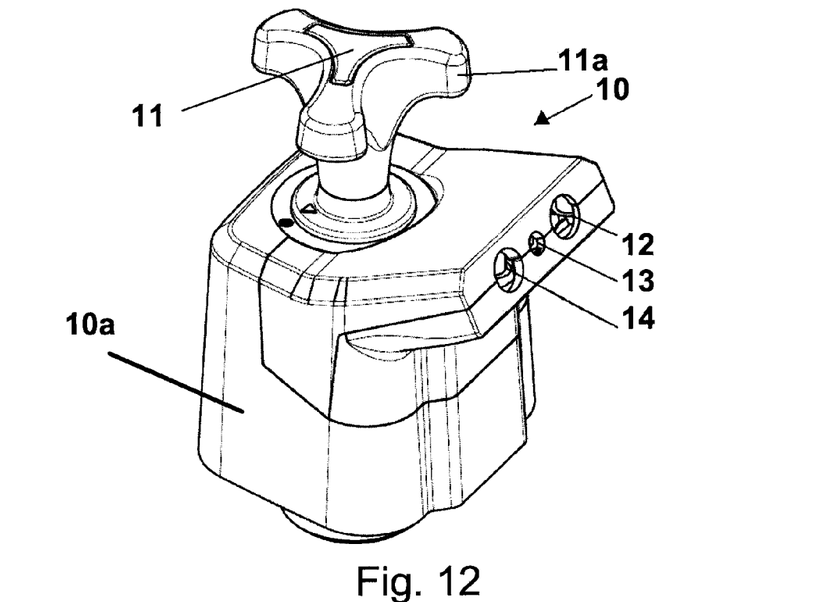
FIG. 12 discloses charging contact according to the invention.
Figure 13:
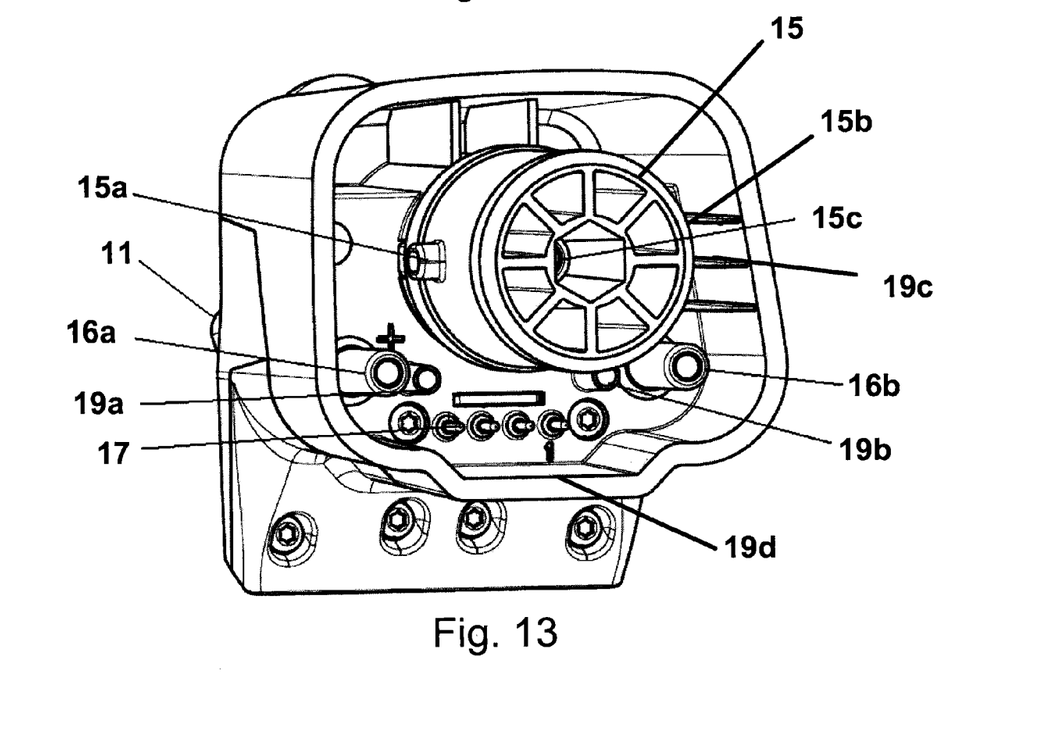
FIG. 13 discloses a charging contact according to FIG. 12.

The electric truck charging contact 10 is shown in FIGS. 12 and 13. Truck charging contact is to be understood the contact that is adapted to be able to be applied on the truck contact 20 according to the above. It is also intended to be able to be applied specifically to this contact and not to other contact devices in general. The truck charging contact 10 is intended to be attached to the warehouse truck 1 by means of the truck contact 20. The truck charging contact 10 is arranged in the following way. On the outside there is a grip device 11. The grip device 11 is intended to be able to be swivelled with hand power by an operator. The grip device 11 has suitably wings 11a and suitably soft and round shape such that handling of the device 11 can be performed with comfort. The grip device 11 is preferably a wheel, but could have a diverging shape that allows operation by the use of hands. The wings 11a have such that the grip device can be handled with hand power, and perform the connection of the truck charging contact, an extension transversally to the swivel axis. The extension should be in the range 1 cm to 8 cm to give enough leverage for an operator. The grip device 11 is preferably arranged such that it is symmetric such that an operator can grip it from any optional direction for swivelling it. The truck charging contact 10 discloses on the outside an outlet opening for a current cable 12 and 14. It also discloses an outlet opening 13 for a communication cable. This design can vary, the number of holes and size is dependent of how the connecting cables are constituted. When viewing the inside of the charging contact 10 disclosed in FIGS. 12 and 13, the following is disclosed:

Centrally positioned in the truck charging contact 10 there is a circular protrusion 15. The protrusion 15 has the shape of a cylinder. The protrusion 15 is intended to be able to pass the cylindrically shaped section on the truck contact 20. The periphery of the protrusion has two smaller protrusions 15a. These protrusions 15a and 15b are designed such that they can pass in the notch 23 of the truck contact 20. Thus the protrusion 15a and 15b are positioned opposite. However it shall be understood that if the truck contact 20 has only one notch 23, and 25 the truck contact 10 is adapted by having only one protrusion 15a. Centrally in the protrusion 15 a swivel axle 15c is positioned that allows for swivelling of the whole protrusion 15. The axle 15c is connected to the grip device 11 for swivelling of the axle 15c. The axle 15c is thus connected to the protrusion 15 and swivels at the same time the protrusion 15 when the axle 15c is swivelled. In FIG. 13 can further be seen connection pins 16a and 16b for connecting the contact holes 21a and 21b of the charging contact. The connection pins 16a and 16b have preferably a centrally axially running notch. The connection pins notches are intended to enclose the contact holes 21a, 21b centrally positioned contact pins of the truck contact 20. Further connection pins 17 for CAN-communication are disclosed.

The truck charging contact 10 discloses a second group of guide means, to cooperate with the first group of guide means on the truck contact. In this second group of guide means there is included an optional guide protrusion 19a and 19b that guide the charging contact 10 in the correction position in particular with regard to the optional CAN-communication pins 17. Further the second group of guide means truck contact 10 discloses guide rails 19c for connecting to the guide ribs 27 of the truck contact. The guide rails 19c can be designed in any optional way and do not need to be three as disclosed in FIG. 13. If having three guide rails 19c a god guiding is achieved. Further the second group of guide means discloses a notch 19d that is adapted to connect and partially enclose the protrusion 26 on the truck contact 20. The cooperation of the guide rails 19c with the guide ribs 27 and the cooperation of the notch 19d with the protrusion 26 provide for that the charging contact 10 can only be applied in one unique way, which prevents that wrong pole, is wrongly connected when charging. Also the cover 10a itself, of the truck charging contact, having a rectangular shape constitutes a guiding device for the charging contact 10.

Figure 14:
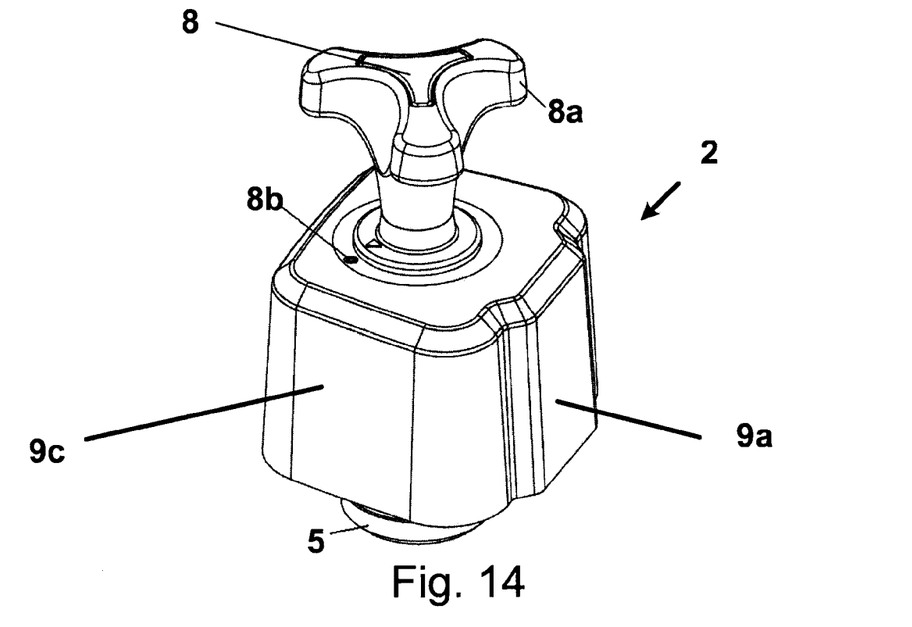
FIG. 14 discloses an operation clamp according to the invention.
Figure 15:
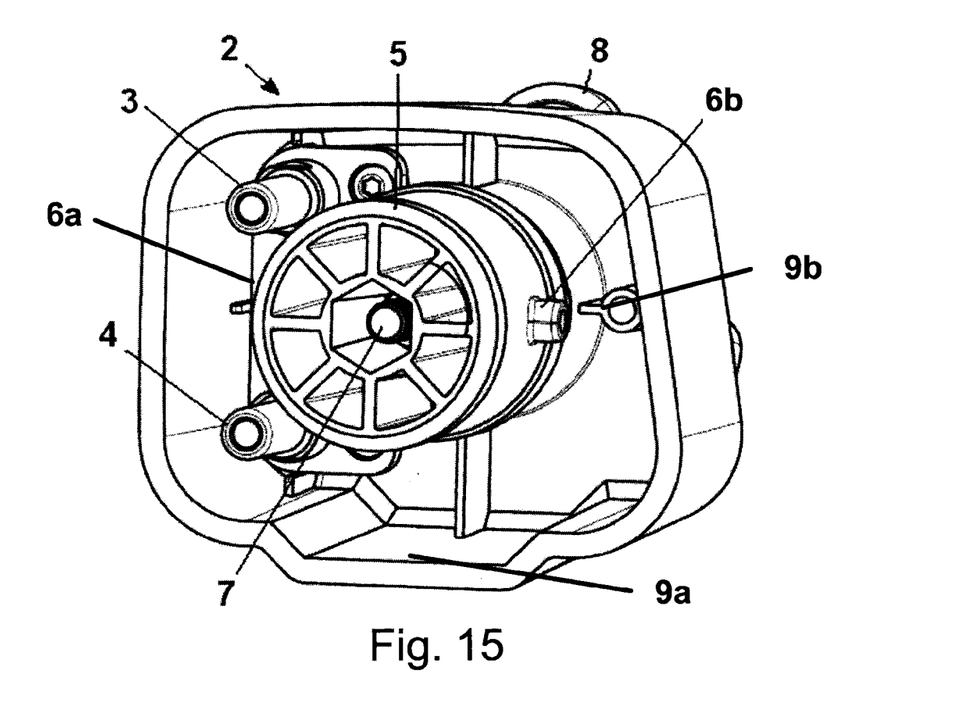
FIG. 15 discloses an operation clamp according to FIG. 14.

In addition to the truck contact 20 of the warehouse truck 1 and the charging contact 10 there is in the warehouse truck arrangement 53, FIG. 16, an already mentioned electric truck operation clamp 2, see FIGS. 14 and 15. The operation clamp 2 clamps the contact holes 21b and 21c of the truck contact 20. The clamping is performed according to FIG. 1. The operation clamp 2 comprises in similarity to the charging contact 10 a grip device 8. The grip device has essentially the same design as the grip device 11 on the charging contact 10. On the inside of the operation clamp 2 there are in accordance with FIG. 15 two connection pins 13 and 14 intended to clamp the holes of the connection holes of the truck contact 20. The connection pins 13, 14 have in accordance with their correspondence on the truck charging contact 10 centrally positioned notches. The notches of the connection pins are intended to enclose the centrally positioned contact pins of the contact holes 21a, 21b. In accordance with the truck charging contact 20 the operation clamp 2 comprises a circular protrusion 5. The central protrusion 5 has a cylindrical shape, and comprises two smaller protrusions 6a, 6b on the periphery. The protrusions 6a and 6b are intended to connect through the notches 23 to the notches 25 on the charging contact. In accordance with the charging contact 10 and the truck contact 20 the smaller protrusions 6a, 6b can also be only one. An axle 7 runs centrally and has the same function as the axle 15b of the charging contact 10.

The operation clamp 2 comprises also a third group of guide means that is intended to cooperate with the first group of guide means on the truck contact 20. The third group of guide means comprises guiding device 9b for engaging with the guide ribs 27 of the charging contact. The guiding device 9b is disclosed as a single rail of FIG. 15. But it can of course be designed according to the rails 19c of the truck charging contact 10. In accordance with the truck charging contact 2 the operation clamp 10a has a cover 9c that has a rectangular shape and thereby constitutes a guiding device in itself with the truck contact 20.

If the operation clamp 2 is not connected the circuit is not closed to the consumers in the shape of for example a drive motor 62. Thus the warehouse truck 1 cannot be operated without a connected operation clamp 2.

The function of the warehouse truck 1 according to the invention is thus as follows:

In normal operation the operation clamp 2 is connected to the truck contact 20. This is done by the grip devices 8 of the operation clamp being swivelled for attachment to the truck contact 20. The protrusions 6a and 6b has thus followed the spiral shaped notch 25 of the truck contact 20 and terminated their run in the stop notch 25a. The operation clamp 2 is positioned on the warehouse truck 1 such that it is easily accessible by an operator. The warehouse truck is driven by the operator to a position where charging of the battery 60 can take place. In this position a not connected truck charging contact 10 is positioned. The operator then swivels the grip devices 8 of the operation clamp in opposite direction such that the protrusions 6a, 6b runs in the notch 25 until they are present opposite the notches 23 of the truck contact 20. The pitch of the notch 25 provides for that the operation clamp 2 moves in axial direction away from the truck contact 20. During this movement the contact pins 3, 4 are also moved in axial direction in the contact holes 21b and 21c of the truck contact 20. When the swivel course for the grip device 8 and the cylindrical protrusion 5 is essentially terminated the connection pins 3, 4 have been disconnected from their electric contact with the contact holes 21b and 21c. The operator then takes away the operation clamp 2 and an applies the charging contact 10. The protrusion 19d as well as the guide rails 19c of the charging contact 10 provides for that the charging contact 10 only can be positioned in one single way on the truck contact 20 of the warehouse truck. The protrusions 15a and 15b are positioned opposite the notch 23 and pass this. The operator starts his swivelling of the grip device 11 and the protrusions 15a and 15b now follows the spiral shaped notch 25 on the wall 24a of the cylindrically shaped section of the truck contact 20. When the protrusions 15a and 15b follows the notch 25 the pitch of the notch 25 implies that the connection pins 16a and 16b moves inward in axial direction in the contact holes 21a and 21b of the truck contact 20 of the warehouse truck. This inward movement continues until full connection for the connection pins 16a and 16b when the protrusions comes to a stop in the stop notch 25a. Due to the swivel movement and that the connection pins 16a and 16b not can be connected without guiding from the protrusions 15a, 15b in the notch 25 the connection is made with a delay compared to if only the connection pins 16a and 16b would be connected to the contact holes 21a and 21b. The axial force for the operator is also minimized, and is converted to a swivel force. When this connection is done, the battery of the warehouse truck 60 is ready to be charged. At disconnection the same is performed conversely. The truck charging contact 10 is disconnected with a swivel movement according to disconnection of the operation clamp 2. Due to the extension of the notch 25 the disconnection does not occur as fast for the connection pins 16a and 16b as if solely axial disconnection would have occurred without guiding from the protrusions 15a, 15b in the notch 25. Thereby an external charger can have time to disconnect its charge current before any possible sparks or the like can occur. Preferably the extension of the notch 25 and its cooperation with respective protrusion 6a, 6b; 15a, 15b provides that the disconnection of the operation clamp 2 and charging contact 10 cannot be done faster than approximately 50 milliseconds. Thus also at a forced swivelling the extension shall be such that disconnection cannot occur faster than 40 milliseconds. The definition of the connection and disconnection time is done in the following way: The charger is in communication with the truck through the CAN-communication 22 of FIG. 11 and 17 of FIG. 13, through the truck charging contact 10. When disconnecting the truck charging contact 10 first the CAN-communication pin 17 is disconnected, thereafter it takes at least 40 preferably 50 milliseconds before the connection pins 16a, 16b loses their electric contact with the contact holes 21a and 21b. Before this is occurs the charger shall thus have time to disconnect the current from the pins 21a, 21b in the charging contact 10. At a comparative disconnection of the operation clamp 2 there is normally no pin 17 for CAN-connection. The connection and disconnection time is the timed as when a hypothetical pin with the same design as the pins 17 in the charging contact, alternatively there is introduced a real measure pin for the operation clamp.

The contact elements in the shape of contact holes 21a, 21b and 21c have a length extension that allows for connected contact length for connection of connecting pins 3, 4; 15a, 15b of at least 5 mm to 30 mm, preferably 10 mm to 25 mm, preferably approximately 20 mm. The contact surface shall allow currents up to 500 A to pass a contact hole 21a, 21b and 21c. In any case at least 400 Amperes. If a different design is applied to the contact holes, as an example an increased or decreased diameter, the given dimensions of length can be altered to allow handling of the given current intensities.

With a fully connected position for the connection pins 3, 4; 15a, 15b it is intended to mean that these are introduced in their respective contact holes such that normal operation of the warehouse truck alternatively charging of the warehouse truck can be performed.

The invention comprises thus a warehouse truck arrangement according to FIG. 16, with the comprised pieces a warehouse truck 1, a truck operation clamp 2 and a truck charging contact 10.

The invention likewise concerns a method of modifying a warehouse truck such that it is given a design according to the above. Wherein the warehouse truck is modified such that it has a truck contact 20 according to the above alternatively modified such that it can be use battery 60 with a truck contact 20 according to the above.

The invention claimed is:
1. A warehouse truck comprising;
a lifting device;
an electricity consuming drive motor;
an electricity consuming hydraulic pump motor;
a battery arranged to supply electricity to at least one of the electricity consuming motors;
an electric truck contact in direct connection to or on the battery, wherein the electric truck contact is arranged to take part in the switching between a completely disconnected battery mode, a battery connected for charging mode, and an operating mode for the truck, the truck contact including a first group of guides;
a truck charging contact including a second group of guides cooperating with the first group of guides; and
a truck operation clamp including a third group of guides, wherein the first and the second and the third group of guides provide for that the truck contact and the truck charging contact (10), and the truck operation clamp, only can be connected in a predetermined position, further the truck contact includes three contact elements and the truck contact includes a notch, wherein said notch intersects a spiral shaped groove with a predetermined pitch, wherein said notch receives one of a protrusion on the truck charging contact and a protrusion on the truck operation clamp, which results in that the respective contact element engaging with at least one connection pin, on one of the truck charging contact and the operation clamp (2) to a fully connected position when the one of the protrusion on the truck charging contact and the protrusion on the truck operation clamp completes movement in said spiral shaped groove which drives the at least one connection pin for connection of one of the truck charging contact and the operation clamp, wherein the spiral shaped groove has an extension and a pitch arranged such that connection and disconnection of the at least one connection pin to and from the fully connected position, is delayed compared with a linear connection and disconnection respectively with a lack of guiding by the protrusions in the groove.

2. The warehouse truck according to claim 1, wherein the spiral shaped groove has a pitch and extension that are arranged such that the connection and disconnection time for the truck charging contact or the operation clamp to the truck contact reaches at least 40 milliseconds.

3. The warehouse truck according to claim 1, wherein the spiral shaped groove runs to a stop that is positioned in the range 75-100 degrees of extension viewed axially for the truck contact.

4. The warehouse truck according to claim 1, wherein the spiral shaped groove has a pitch that lead to that a charging contact or an operation clamp moves a distance in the range of 5 mm to 30 mm from disconnected to fully connected position and the opposite, at the truck contact.

5. The warehouse truck according to claim 1, wherein the truck contact is arranged to be able to handle electric currents intensities up to 500 Amperes.

6. The warehouse truck according to claim 1, wherein the groove is provided with a stop for indicating fully connected position.

7. An electric truck charging contact charging the warehouse truck according to claim 1, wherein the charging contact comprises:
  a grip device connected to an axle which in turn is connected to a first protrusion including at least a smaller protrusion adapted to be able to pass in the notch and the spiral shaped groove, and that the first protrusion when swivelling the grip device, the smaller protrusion can follow the spiral shaped groove of the truck contact of the warehouse truck, for thereby achieving a connection and disconnection time that is delayed compared to a linear connection, with a lack of guiding of the smaller protrusion in the groove.

8. The electric truck charging contact according to claim 7, wherein the grip device is arranged with wings that are arranged symmetrically.

9. An electric truck operation clamp used with the warehouse truck according to claim 1, wherein the truck operation clamp includes a grip device connected with an axle which in turn is connected with a first protrusion including at least a smaller protrusion adapted to be able to pass in the notch and the spiral shaped groove on the truck contact of the warehouse truck, and that the first protrusion when swivelling the grip device after passage of the smaller protrusion can this follow the spiral shaped groove of the truck contact of the warehouse truck, in order to thereby achieve a connection and disconnection time that is delayed compared to a linear connection, with lack of guiding by the smaller protrusion in the groove.

10. The electric truck operation clamp according to claim 9, wherein the grip device is arranged with wings that are arranged symmetrically.

\* \* \* \* \*